United States Patent [19]

Dwivedi et al.

[11] Patent Number: 4,806,508
[45] Date of Patent: Feb. 21, 1989

[54] MODIFIED CERAMIC STRUCTURES AND METHODS OF MAKING THE SAME

[75] Inventors: Ratnesh K. Dwivedi, Wilmington; Christopher R. Kennedy, Newark, both of Del.

[73] Assignee: Lanxide Technology Company, LP, Newark, Del.

[21] Appl. No.: 908,458

[22] Filed: Sep. 17, 1986

[51] Int. Cl.$^4$ .............................................. C04B 35/10
[52] U.S. Cl. ..................................... 501/94; 501/102; 501/127; 501/128; 501/132; 501/134; 264/60; 264/65
[58] Field of Search ............... 501/87, 88, 94, 96, 501/98, 92, 119, 127, 128, 102, 134, 132; 423/345, 412, 618, 625, 411; 264/65, 60; 75/235

[56] References Cited

U.S. PATENT DOCUMENTS

| | | | |
|---|---|---|---|
| 2,741,822 | 4/1956 | Udy | 264/65 |
| 3,255,027 | 6/1966 | Talsma | 264/65 |
| 3,296,002 | 1/1967 | Hare | 501/80 |
| 3,298,842 | 1/1967 | Seufert | 501/127 |
| 3,419,404 | 6/1964 | Mao | 501/98 |
| 3,421,863 | 1/1969 | Bawa | 501/128 |
| 3,437,468 | 4/1969 | Seufert | 75/235 |
| 3,473,938 | 10/1969 | Oberlin | 264/65 |
| 3,473,987 | 10/1969 | Sonards | 501/119 |
| 3,538,231 | 11/1970 | Newkirk et al. | 373/117 |
| 3,789,096 | 1/1974 | Church et al. | 51/307 |
| 3,864,154 | 2/1975 | Gazza | 428/539.5 |
| 3,973,977 | 8/1976 | Wilson | 501/120 |

FOREIGN PATENT DOCUMENTS 0116809 8/1984 European Pat. Off. .
0169067 1/1986 European Pat. Off. .

OTHER PUBLICATIONS

"Oxidation of Molten Aluminum Alloys. Reaction with Refractories", by M. Drouzy and M. Richard–Mar. 1974–Fonderie, France, No. 332, pp. 121–128.

"Refractories for Aluminum Alloy Melting Furnaces", by B. Clavaud and V. Jost, Sep. 1980–Trans. Lilliam Brassinga, Jan. 1985.

*Primary Examiner*—William R. Dixon, Jr.
*Assistant Examiner*—Ann M. Knab
*Attorney, Agent, or Firm*—Mark G. Mortenson; William E. McShane

[57] ABSTRACT

A method of producing self-supporting ceramic structures comprising (i) a polycrystalline oxidation reaction product formed upon oxidation of a body of molten parent metal with an oxidant, and (ii) interconnected porosity at least partially accessible from one or more surfaces of said ceramic body. A second polycrystalline ceramic material is incorporated into the porosity of said ceramic body to modify or contribute to its properties.

12 Claims, 2 Drawing Sheets

MODIFIED CERAMIC STRUCTURES AND METHODS OF MAKING THE SAME

BACKGROUND

1. Field of the Invention

The present invention relates generally to a method of modifying a self-supporting ceramic body having interconnected porosity by incorporating a second polycrystalline ceramic material into at least some of the porosity of the first ceramic body. More particularly, this invention relates to self-supporting ceramic structures formed as the oxidation reaction product of a parent metal and having a polycrystalline ceramic occupying at least a portion of the original interconnected porosity. The invention also relates to methods for producing such ceramic structures.

2. Description of Commonly Owned Patent Applications and Prior Art

The subject matter of this application is related to copending and commonly owned U.S. patent applications Ser. No. 818,943 now U.S. Pat. No. 4,713,360, filed Jan. 15, 1986, which is a continuation-in-part of Ser. No. 776,964 now abandoned, filed Sept. 17, 1985, which is a continuation-in-part of Ser. No. 705,787 now abandoned, filed Feb. 26, 1985, which is a continuation-in-part of U.S. application Ser. No. 591,392 now abandoned, filed Mar. 16, 1984, all in the name of Marc S. Newkirk et al. and entitled "Novel Ceramic Materials and Methods for Making the Same." These applications disclose the method of producing self-supporting ceramic bodies grown as the oxidation reaction product of a parent metal precursor. Molten parent metal is reacted with a vapor-phase oxidant to form an oxidation reaction product, and the metal migrates through the oxidation product toward the oxidant thereby continuously developing a polycrystalline ceramic body which can be produced having an interconnected metallic component and/or interconnected porosity. The process may be enhanced by the use of an alloyed dopant, such as in the case of an aluminum parent metal oxidized in air. This method was improved by the use of external dopants applied to the surface of the precursor metal as disclosed in commonly owned and copending U.S. patent application Ser. No. 822,999 pending, filed Jan. 27, 1986, which is a continuation-in-part of Ser. No. 776,965 now abandoned, filed Sept. 17, 1985, which is a continuation-in-part of Ser. No. 474,788 now abandoned filed June 25, 1985, which is a continuation-in-part of Ser. No. 632,636 now abandoned, filed July 20, 1984, all in the name of Marc S. Newkirk et al. and entitled "Methods of Making Self-Supporting Ceramic Materials".

The subject matter of this application is also related to that of commonly owned and copending U.S. patent application Ser. No. 819,397 pending, filed Jan. 17, 1986, which is a continuation-in-part of Ser. No. 697,876 now abandoned, filed Feb. 4, 1985, both in the name of Marc S. Newkirk et al. and entitled "Composite Ceramic Articles and Methods of Making Same". These applications disclose a novel method for producing self-supporting ceramic composites by growing an oxidation reaction product from a parent metal into a permeable mass of filler, thereby infiltrating the filler with a ceramic matrix.

The entire disclosure of all of the foregoing Commonly Owned Patent Applications are expressly incorporated herein by reference.

Common to each of these commonly owned patent applications is the disclosure of embodiments of a ceramic body comprising an oxidation reaction product and, optionally, one or more nonoxidized constituents of the parent metal precursor, or voids, or both. The oxidation reaction product may exhibit interconnected porosity which may be a partial or nearly complete replacement of the metal phase. The interconnected porosity will largely depend on such factors as the temperature at which the oxidation reaction product is formed, the length of time at which the oxidation reaction is allowed to proceed, the composition of the parent metal, the presence of dopant materials, etc. Some of the interconnected porosity is accessible from an external surface or surfaces of the ceramic body, or is rendered accessible by a post-process operation as by machining, cutting, grinding, fracturing, etc.

SUMMARY OF THE INVENTION

Briefly, the present invention is directed to a method of producing a self-supporting ceramic body containing or having incorporated therein a second polycrystalline ceramic component. This second ceramic component is sufficient so as to alter, modify or contribute to the properties of the ceramic body originally formed. In accordance with the method of the present invention, a ceramic body is formed by the oxidation reaction of a parent metal with an oxidant, such as described above in connection with the commonly owned patent applications. The ceramic body is produced to have interconnected porosity distributed through at least a portion of the ceramic body in one or more dimensions, and further is at least partially open or accessible, or rendered accessible, from at least one external surface of the body. A second ceramic material, or a precursor thereof is contacted with the ceramic body at the accessible surface so as to infiltrate or impregnate at least a portion of the interconnected porosity followed by a subsequent heating, catalyzing or the like, where required, thereby forming a ceramic body containing a second ceramic component.

The self-supporting ceramic body of the present invention comprises a polycrystalline ceramic product having (a) interconnected reaction product crystallites formed upon oxidation of a molten parent metal with an oxidant, and (b) interconnected porosity at least partially open or accessible, or rendered accessible, from the surface(s) of the ceramic body. At least a portion of the interconnected porosity contains a second polycrystalline ceramic material.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body contains minor or substantial amounts of one or more metallic constituents and/or porosity (interconnected and isolated) most typically within a range of from about 1–40% by volume, but may be higher.

"Oxidation reaction product" generally means one or more metals in any oxidized state wherein the metal has given up electrons to or shared electrons with another element, compound, or combination thereof. Accordingly, an "oxidation reaction product" under this definition includes the product of reaction of one or more metals with an oxidant such as those described herein.

"Oxidant" means one or more suitable electron acceptors or electron sharers and may be a solid, a liquid or a gas (vapor) or some combination of these (e.g., a solid and a gas) at the process conditions for ceramic growth.

"Parent metal" is intended to refer to relatively pure metals, commercially available metals with impurities and/or alloying constituents therein, and alloys and intermetallic compounds of the metals. When a specific metal is mentioned, the metal identified should be read with this definition in mind unless indicated otherwise by the context. For example, when aluminum is the parent metal, the aluminum may be relatively pure metal (e.g., commercially available aluminum 99.7% purity), or 1100 aluminum having as nominal impurities of about 1% by weight silicon plus iron, or aluminum alloys such as, for example, 5052.

DETAILED DESCRIPTION OF THE INVENTION AND THE PREFERRED EMBODIMENTS

In accordance with the method of this invention, a self-supporting ceramic body is produced with interconnected porosity. The interconnected porosity is at least partially open or accessible from an external surface (or surfaces), or is rendered accessible by post-process treatment. A significant or substantial amount of the interconnected porosity is filled, infiltrated, or the like, with a second polycrystalline material which becomes integral with the ceramic structure, thereby modifying, improving or contributing to certain properties of the first ceramic body. Although the invention is described below with particular reference to aluminum as parent metal, it should be understood that other parent metals are also applicable, such as silicon, titanium, tin, zirconium, and hafnium.

Figure 1:
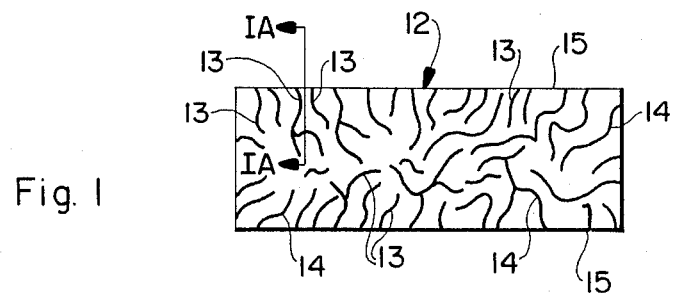
FIG. 1 is a schematic view of a ceramic body having interconnected porosity and interconnected metal.
Figure 1A:
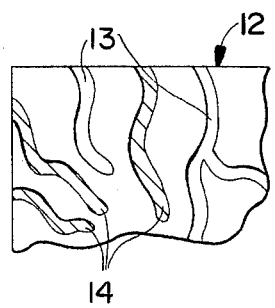
FIG. 1A is an enlarged section on line 1A—1A of FIG. 1.

Referring to FIG. 1, a self-supporting first polycrystalline ceramic body 12 is provided, which is made, for example, by the methods of any of the above referred to commonly owned patent applications. Accordingly, a first parent metal, e.g. aluminum, which may be doped (as explained below in greater detail) is provided as the precursor to the first oxidation reaction product. The parent metal is melted and heated to a temperature within an appropriate temperature range in oxidizing environment. At this temperature, or within this temperature range, the molten parent metal reacts with the oxidant to form a polycrystalline oxidation reaction product. At least a portion of the oxidation reaction product is maintained in contact with and between the molten parent metal and the oxidant to draw molten parent metal through the oxidation reaction product and into contact with the oxidant, such that the oxidation reaction product continues to form at the interface between the oxidant and previously formed oxidation reaction product. The reaction is continued for a time sufficient to form the polycrystalline ceramic body 12 comprising or consisting essentially of the oxidation reaction product, having interconnected porosity 13, and/or an interconnected metallic constituent 14. Interconnected metallic constituent 14, below sometimes referred to simply as metal or metal component 14, comprises nonoxidized constituents of the parent metal and may include dopants or other metal inclusions. The interconnected porosity 13, as well as the interconnected metallic constituent 14, are interconnected in one or more dimensions and are dispersed or distributed through part or substantially all of the polycrystalline material. This porosity 13, and metal 14, formed in situ during formation of the polycrystalline oxidation reaction product, are both at least partially open or accessible from at least one surface, as at surfaces 15, of the ceramic body, or may be rendered accessible as by machining or fracturing. Some of the porosity and the metal may be isolated as islands. The volume percents of porosity 13 (interconnected and isolated) and metallic constituent 14 (interconnected and isolated) will depend largely on such conditions as temperature, time, dopants, and type of first parent metal employed in making the ceramic body 12.

Figure 2:
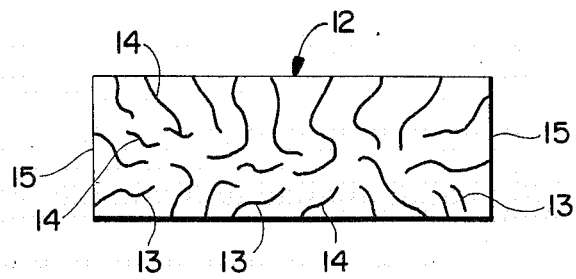
FIG. 2 is a schematic, partially cross-sectional view of a ceramic body after a substantial part of the interconnected metal has been removed.

In a preferred embodiment of the invention, essentially or substantially all of the interconnected metal 14 is or should be removed to produce the self-supporting ceramic body 12 having interconnected porosity 13 distributed through part or substantially all of the polycrystalline material, as illustrated in FIG. 2. In order to remove all or a substantial part of the interconnected metal 14, the oxidation reaction process may be taken to completion; that is, when the metal phase has been completely reacted or nearly completely reacted to form oxidation reaction product, the interconnected metal component 14 is drawn from the ceramic body 12, leaving interconnected porosity 13 in its place, and is oxidized to form additional ceramic on its surfaces 15. If the process is taken to completion, the oxidation reaction product will exhibit a higher volume percent of porosity 13 which is at least partially interconnected. For example, a ceramic body formed from aluminum processed in air at about 1125° C. may contain from about 20 volume percent to about 30 volume percent metal 14, and from about 2 volume percent to about 5 volume percent porosity 13 when growth is stopped before all the first parent metal is oxidized; and if processed to complete the oxidation of all the first parent metal, it may contain from about 1 volume percent to about 3 volume percent metallic constituents 14 and from about 25 volume percent to about 30 volume percent (or higher) voids or pores (porosity) when the process is run to completion.

Figure 3:
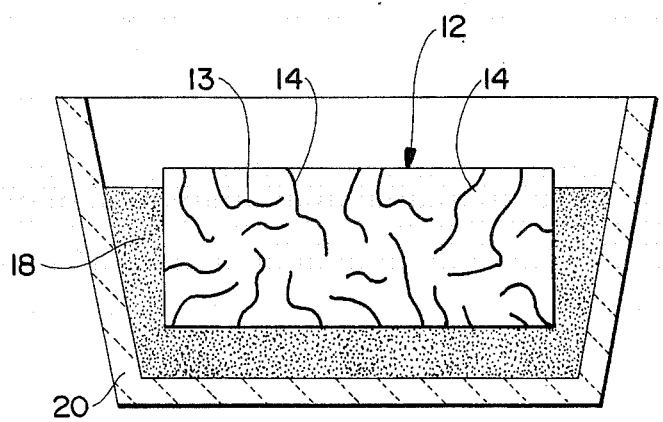
FIG. 3 is a schematic view of a ceramic body in an inert bed contained within a crucible which is to be inserted into a furnace to vaporize the interconnected metal.

A second method or means of removing interconnected metal 14 is to place the ceramic body on an inert bed 18 that is contained within a crucible or other refractory container 20 (see FIG. 3). The container 20 and its contents are then placed into a furnace having an inert atmosphere (e.g. argon or any other non-reactive gas) and heated to temperatures where the metallic constituent 14 will have a high vapor pressure. This temperature or preferred range can vary depending upon the end composition of the metallic constituent 14 in the ceramic body. At the suitable temperature, interconnected metal 14 will vaporize from the ceramic body but no additional oxidation reaction product will form because of the inert atmosphere. By maintaining these temperatures, the interconnected metal 14 will continue to vaporize and be carried away from the furnace as by a suitable venting means within the furnace.

Figure 4:
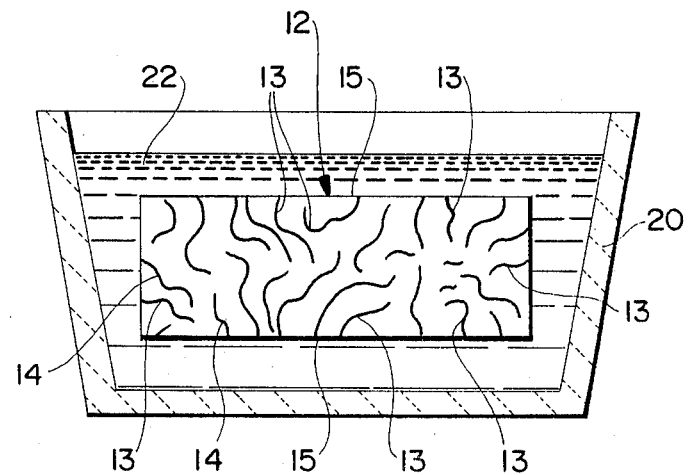
FIG. 4 is a schematic view of a ceramic body immersed in a leachant in order to remove the interconnected metal.

A third method or means of removing interconnected metal 14 is to or immerse the ceramic body 12 into a suitable leachant 22 to dissolve or disperse out the interconnected metal 14 (see FIG. 4). The leachant 22 may be any acidic or caustic liquid or gas which will depend upon such factors as the composition of metal 14, the time of immersion, etc. In the case of using aluminum as the parent metal, and therefore having aluminum in the interconnected metal 14, HCl has been found to be a suitable acidic medium. If the ceramic body contains silicon, NaOH and/or KOH solutions are an acceptable caustic medium. The time of immersion of the ceramic body in the leachant 22 will depend upon the amount and type of the metal component 14, and where the interconnected metal 14 is situated with respect to the surface(s) 15. The deeper the interconnected metal 14 is in the ceramic body 12 the longer it will take such metal 14 to be leached or etched-out, and the longer the ceramic body will have to left in the leachant 22. This extraction step may be facilitated by heating the leachant or by agitating the bath of leachant. After the ceramic body 12 has been removed from the leachant 22, it should be washed with water to remove any residual leachant.

When essentially or substantially all of the interconnected metal 14 has been removed, a self-supporting first ceramic body 12 is produced which comprises a polycrystalline oxidation reaction product formed upon oxidation of a molten parent metal precursor with an oxidant and interconnected porosity 13 which preferably comprises from about 5 volume percent to about 45 volume percent of the first ceramic body 10.

A second polycrystalline ceramic material is incorporated into the porosity to improve or contribute to the properties of the end product. A variety of polycrystalline ceramic materials can be incorporated into the porosity, and become integrated therewith, and preferably includes a precursor to the ceramic. For example, chromia can be incorporated into the porosity by impregnating the ceramic body with a solution of chromic acid. The impregnated body is heated to a sufficient temperature to decompose the acid and leave a residium or deposit of chromia. This process step is typically repeated to build-up a sufficient depth of chromia. The chromia content can be useful, for example, in lowering the thermal conductivity of the ceramic body. As a further useful example, silica can be incorporated into the porosity of the ceramic body from a precursor such as low melting point silica glasses or from such materials as tetraethyl orthosilicate. Here again, a plurality of immersions and conversions to silica deposit may be desirable or required to obtain a sufficient build-up. The silica content decreases the conductivity of the ceramic body and therefore could be useful as a heating element.

As explained above, the ceramic body is produced from a suitable parent metal according to the processes disclosed in the commonly owned patent applications.

In one preferred embodiment of this invention, a composite is produced by utilizing a mass or bed of permeable filler material placed adjacent to and in contact with a surface of the parent metal, and the process is continued until the oxidation reaction has infiltrated the bed of filler material to its boundary, which can be defined by a suitable barrier means. The mass of filler, which preferably is shaped as a preform, is sufficiently porous or permeable to allow the oxidant, in the case of a vapor-phase oxidant, to permeate the filler and contact the parent metal, and to accommodate growth of the oxidation reaction product within the filler. Alternatively, the oxidant may be contained within or comprise the filler. The filler may include any suitable material such as particulates, powders, platelets, hollow bodies, spheres, fibers, whiskers, etc., which typically are ceramic materials. Further, the bed of filler may include a lattice of reinforcing rods, plates, or wires. Typically in these polycrystalline ceramic structures, including ceramic composites, the oxidation reaction product crystallites are interconnected and the porosity and/or metallic component are at least partiallyinterconnected and accessible from an external surface of the ceramic body.

As explained in the commonly owned patent applications, dopant materials used in conjunction with the parent metal can, in certain cases, favorably influence the oxidation reaction processes, particularly in systems employing aluminum as the parent metal. The function or functions of a dopant material can depend upon a number of factors other than the dopant material itself. Such factors include, for example, the particular combination of dopants when two or more dopants are used, the concentration of the dopant(s), the oxidizing environment, and the process conditions.

The dopant or dopants used in conjunction with the parent metal (1) may be provided as alloying constituents of the parent metal, (2) may be applied to at least a portion of the surface of the parent metal, or, (3) when a filler is utilized, may be applied to or incorporated into part of all or the filler material or preform, or any combination of two or more techniques (1), (2) and (3) may be employed. For example, an alloyed dopant may be used solely or in combination with a second externally applied dopant. In the case of technique (3), where additional dopant or dopants are applied to the filler material, the application may be accomplished in any suitable manner as explained in the Commonly Owned Patent Applications.

Dopants useful for an aluminum parent metal, particularly with air as the oxidant, include magnesium, zinc, and silicon either alone or in combination with each other or in combination with other dopants, as described below. These metals, or a suitable source of the metals, maybe alloyed into the aluminum-based parent metal at concentrations for each of between about 0.1–10% by weight based on the total weight of the resulting doped metal. These dopant materials or a suitable source thereof (e.g. MgO, ZnO, or $SiO_2$) may also be used externally to the parent metal. Thus, an alumina ceramic structure is achievable for an aluminum-silicon alloy as the parent metal using air as the oxidant by using MgO as a surface dopant in an amount greater than about 0.0008 gram per gram of parent metal to be oxidized or greater than 0.003 gram per square centimeter of parent metal upon which the MgO is applied.

Additional examples of dopant materials effective with aluminum parent metals oxidized with air include sodium, germanium, tin, lead, lithium, calcium, boron, phosphorus, and yttrium which may be used individually or in combination with one or more other dopants depending on the oxidant and process conditions. Rare earth elements such as cerium, lanthanum, praseodymium, neodymium, and samarium are also useful dopants, and herein again especially when used in combination with other dopants. All of the dopant materials as explained in the commonly owned patent applications are effective in promoting polycrystalline oxidation reaction product growth for the aluminum-based parent metal systems.

A solid, liquid or vapor-phase (gas) oxidant, or a combination of such oxidants, may be employed with the parent metal. For example, typical oxidants include, without limitation, oxygen, nitrogen, a halogen, sulphur, phosphorus, arsenic, carbon, boron, selenium, tellurium, and compounds and combinations thereof, for example, silica (as a source of oxygen), methane, ethane, propane, acetylene, ethylene, and propylene (as sources of carbon), and mixtures such as air, $H_2/H_2O$ and $CO/CO_2$, the latter two (i.e., $H_2/H_2O$ and $CO/CO_2$) being useful in reducing the oxygen activity of the environment.

Although any suitable oxidants may be employed as described above, a vapor-phase oxidant, is preferred However, it should be understood that two or more types of oxidants may be used in combination with the first parent metal. If a vapor-phase oxidant is used in conjunction with the parent metal and a filler, the filler is permeable to the vapor-phase oxidant so that upon exposure of the bed of filler to the oxidant, the vapor-phase oxidant permeates the bed of filler to contact the molten parent metal therein. The term "vapor-phase oxidant" means a vaporized or normally gaseous material which provides an oxidizing atmosphere. For example, oxygen or gas mixtures containing oxygen (including air) are preferred vapor-phase oxidants when an oxide is the desired oxidation reaction product, with air usually being more preferred for obvious reasons of economy. When an oxidant is identified as containing or comprising a particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the sole oxidizer for the parent metal because oxygen is a significantly stronger oxidant than nitrogen. Air, therefore, falls within the definition of an "oxygen-containing gas" oxidant but not within the definition of a "nitrogen-containing gas" oxidant. An example of a "nitrogen-containing gas" oxidant as used herein and in the claims is "forming gas", which contains about 96 volume percent nitrogen and about 4 volume percent hydrogen.

When a solid oxidant is employed in conjunction with the parent metal and a filler, it is usually dispersed through the entire bed of filler or through that portion of the bed comprising the desired ceramic composite body, in the form of particulates admixed with the filler, or perhaps as coatings on the filer particles. Any suitable solid oxidant may be thus employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum first parent metal, the resulting oxidation reaction product is aluminum boride.

In some instances, the oxidation reaction of the parent metal may proceed so rapidly with a solid oxidant that the oxidation reaction product tends to fuse due to the exothermic nature of the process. This occurrence can degrade the microstructural uniformity of the ceramic body. This rapid exothermic reaction can be ameliorated by mixing into the composition relatively inert fillers which exhibit low reactivity. An example of such a suitable inert filler is one which is identical to the intended oxidation reaction product.

If a liquid oxidant is employed in conjunction with the parent metal and a filler, the entire bed of filler, or that portion comprising the desired ceramic body, is impregnated with the oxidant. The filler, for example, may be coated or soaked as by immersion in the oxidant to impregnate the filler. Reference to a liquid oxidant means one which is a liquid under the oxidation reaction conditions and so a liquid oxidant may have a solid precursor, such as a salt, which is molten at the oxidation reaction conditions. Alternatively, the liquid oxidant may be a liquid precursor, e.g., a solution of a material, which is used to impregnate part or all of the filler and which is melted or decomposed at the oxidation reaction conditions to provide a suitable oxidant moiety. Examples of liquid oxidants as herein defined include a low melting glasses.

As described in co-pending U.S. patent application Ser. No. 861,024 filed on May 8, 1986, and assigned to the same assignee, a barrier means may be used in conjunction with the filler material or preform to inhibit growth or development of the oxidation reaction product beyond the barrier when vapor-phase oxidants are employed in the formation of the ceramic body. This barrier facilitates the formation of a ceramic body with defined boundaries. Suitable barrier means may be any material, compound, element, composition, or the like, which, under the process conditions of this invention, maintains some integrity, is not volatile, and preferably is permeable to the vapor-phase oxidant while being capable of locally inhibiting, poisoning, stopping, interfering with, preventing, or the like, continued growth of oxidation reaction product. Suitable barriers for use with aluminum parent metal include calcium sulfate (plaster of Paris), calcium silicate, and Portland cement, and mixtures thereof, which typically are applied as a slurry or paste to the surface of the filler material. These barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed or preform is especially desirable. For example, if the preform comprises alumina and the resulting ceramic comprises alumina, the barrier may be admixed with alumina particulate, desirably having a mesh size of about 20-1000, but may be still finer. Other suitable barriers include refractory ceramics or metal sheaths which are open on at least one end to permit a vapor-phase oxidant to permeate the bed and contact the molten parent metal.

EXAMPLE

A ceramic body having interconnected porosity was prepared by the methods of the above-described commonly owned patent applications. Specifically, a preform consisting of a 0.6 cm-thick, 7.6 cm-diameter disk of 30% kaolin and 70% alumina (E67, Norton Company) was coated with powdered silicon on one face and with a water slurry of plaster of paris containing 30% silica on all other faces. A piece of 380.1 aluminum alloy was placed in contact with the silicon-coated face of the preform, and the assembly was fired at 900° C. in air for 48 hours. A metal-bearing alumina matrix infiltrated the preform.

The surface of the preform was treated with 50% aqueous hydrochloric acid for four hours to dissolve out the aluminum alloy. After drying, the aluminum was found to have dissolved from the surface layers of the disk leaving a 1-mm outer zone having a porosity of 33%. Then the disk was treated with an aqeueous solution of chromic acid containing 14 g $CrO_3$ per 150 ml of water. After removal from the solution, the disk was fired at 550° C. Ten such cycles of chromic acid infiltration and heating were performed, after which the porosity of the 1-mm outer zone of the disk was found to have been reduced to about 5-10% by virtue of the deposition of chromic oxide by the treatment. The disk increased in weight by 15.6%.

What is claimed is:

1. A method of producing a self-supporting ceramic composite product comprising the steps of:
   (a) forming a self-supporting ceramic composite body comprising a ceramic matrix of an oxidation reaction product embedding at least one filler material, said self-supporting ceramic composite body exhibiting at least some interconnected porosity and being formed by melting a parent metal and reacting the molten parent metal with an oxidant to form oxidation reaction product and progressively drawing molten metal through the oxidation reaction product toward the oxidant and said at least one filler material so that oxidation reaction product continues to form within said mass of filler material at an interface between the oxidant and previously formed oxidation reaction product and continuing said reaction for a time sufficient to infiltrate at least a portion of said mass of filler material; and
   (b) disposing a second polycrystalline ceramic component in at least a portion of said porosity to form a ceramic composite product containing said second polycrystalline ceramic component.

2. A method of producing a self-supporting ceramic composite product comprising the steps of:
   (a) forming a self-supporting ceramic composite body comprising a ceramic matrix of an oxidation reaction product embedding at least one filler material, said self-supporting ceramic composite body exhibiting at least some interconnected porosity and being formed by melting a parent metal and reacting the molten parent metal with an oxidant to form oxidation reaction product and progressively drawing molten metal through the oxidation reaction product toward the oxidant and said at least one filler material so that oxidation reaction product continues to form within said mass of filler material at an interface between the oxidant and previously formed oxidation reaction product and continuing said reaction for a time sufficient to infiltrate at least a portion of said mass of filler material;
   (b) disposing a precursor material which is capable of forming a second polycrystalline ceramic component into at least a portion of said porosity by contacting said precursor material with said porosity, said precursor material being capable of infiltrating at least a portion of said interconnected porosity; and
   (c) infiltrating at least a portion of said interconnected porosity with said precursor material and effecting formation of said second polycrystalline ceramic component to form a ceramic composite product.

3. The method of claim 1 or claim 2, wherein the interconnected porosity is formed by substantially completely exhausting said molten parent metal, thus creating interconnected porosity in at least part of the ceramic composite body formed in step "a".

4. The method of claim 3, wherein said interconnected porosity is formed by substantially completely exhausting said molten parent metal, thus creating interconnected porosity throughout substantially all of said ceramic composite body.

5. The method of claim 1 or claim 2, wherein said interconnected porosity is formed by contacting said ceramic composite body formed in step "a" with a leachant to dissolve or disperse out interconnected metal, prior to disposing said second polycrystalline ceramic component therein.

6. The method of claim 5, wherein said ceramic composite body formed in step "a" is contacted with said leachant for a time sufficient to dissolve or disperse out interconnected metal in a substantially uniform outer zone while retaining an unaffected central core zone.

7. The method of claim 5, wherein said ceramic composite body formed in step "a" is contacted with said leachant in such a way so as to cause said interconnected metal to be dissolved or dispersed out of a portion of said ceramic composite body.

8. The method of claim 1 or claim 2, wherein the parent metal comprises a metal selected from the group consisting of aluminum, silicon, titanium, tin, zirconium, and hafnium.

9. The method of claim 1 or claim 2, wherein the parent metal comprises aluminum and the polycrystalline oxidation reaction product is primarily alumina.

10. The method of claim 1 or claim 2, wherein the interconnected porosity is between about 5 to 45 percent by volume of the ceramic body before the ceramic is impregnated with said second ceramic component.

11. The method of claim 1 or claim 2, wherein said second ceramic component comprises chromia or silica.

12. A method of producing a self-supporting ceramic composite body comprising the steps of:
   (a) forming a self-supporting ceramic composite body comprising a ceramic matrix of an oxidation reaction product embedding at least one filler material, said self-supporting ceramic composite body exhibiting at least some interconnected porosity and being formed by melting a parent metal and reacting the molten parent metal with an oxidant to form oxidation reaction product and progressively drawing molten metal through the oxidation reaction product toward the oxidant and said at least one filler material so that oxidation reaction product continues to form within said mass of filler material at an interface between the oxidant and previously formed oxidation reaction product and continuing said reaction for a time sufficient to infiltrate at least a portion of said mass of filler material;

(b) contacting said ceramic composite body formed in step "a" with a leachant to remove at least some interconnected metal therefrom; and (c) infiltrating at least a portion of said interconnected porosity with said precursor material and effecting formation of said second polycrystalline ceramic component to form a ceramic composite body.

* * * * *

UNITED STATES PATENT AND TRADEMARK OFFICE
CERTIFICATE OF CORRECTION

PATENT NO. : 4,806,508
DATED : February 21, 1989
INVENTOR(S) : Ratnesh K. Dwivedi et al.

It is certified that error appears in the above-identified patent and that said Letters Patent is hereby corrected as shown below:

On the face of the Patent Under U.S. Patent Documents "3,473,987 10/1969 Sonards" should read as --3,473,987 10/1969 Sowards--,
Column 1, line 30 "name" should read as --names--;
Column 1, line 54 "name" should read as --names--;
Column 1, line 61 "name" should read as --names--;
Column 5, line 12 "or" should be deleted;
Column 5, line 20 "HCl" should read as --HCl--;
Column 5, line 30 "to left" should read as --to be left--;
Column 5, line 43 "body 10" should read as --body 12--;
Column 6, line 22 "partiallyinterconnected" should read as --partially interconnected--;
Column 6, line 41 "part of all or" should read as --part of or all--;
Column 6, line 55 "maybe" should read as --may be--;
Column 7, line 22 "CO/-" should read as --CO/--;
Column 7, line 27 "is preferred" should read as --is preferred.--;
Column 7, line 62 "filer" should read as --filler--;
Column 9, line 9 "of paris" should read as --of Paris--;
Column 9, line 65 "filer" should read as --filler--.

Signed and Sealed this

Eighteenth Day of July, 1989

Attest:

DONALD J. QUIGG

Attesting Officer

Commissioner of Patents and Trademarks